US009418530B2

(12) United States Patent
Rapaport et al.

(10) Patent No.: US 9,418,530 B2
(45) Date of Patent: Aug. 16, 2016

(54) WIRELESS SAFETY ALERT SIGNALING SYSTEM

(71) Applicants: Patti A. Rapaport, Bangor, ME (US); Ryan Enman, Orrington, ME (US); Daryl B. Boyington, Hampden, ME (US)

(72) Inventors: Patti A. Rapaport, Bangor, ME (US); Ryan Enman, Orrington, ME (US); Daryl B. Boyington, Hampden, ME (US)

( * ) Notice: Subject to any disclaimer, the term of this patent is extended or adjusted under 35 U.S.C. 154(b) by 624 days.

(21) Appl. No.: 13/906,409

(22) Filed: May 31, 2013

(65) Prior Publication Data

US 2014/0354427 A1 Dec. 4, 2014

(51) Int. Cl.
*G08B 21/02* (2006.01)
*G08C 17/00* (2006.01)
*B60R 25/02* (2013.01)

(52) U.S. Cl.
CPC .................................... *G08B 21/02* (2013.01)

(58) Field of Classification Search
None
See application file for complete search history.

(56) References Cited

U.S. PATENT DOCUMENTS

| | | | | |
|---|---|---|---|---|
| 6,463,273 | B1 | 10/2002 | Day | |
| 7,148,791 | B2 | 12/2006 | Grisham et al. | |
| 7,227,446 | B2 * | 6/2007 | Kumazaki | B60R 25/24 340/5.6 |
| 7,880,604 | B2 | 2/2011 | McKenna et al. | |
| 7,889,066 | B2 | 2/2011 | McKenna et al. | |
| 8,009,035 | B1 | 8/2011 | Vallaire | |
| 8,013,733 | B1 | 9/2011 | Vallaire | |
| 8,188,878 | B2 | 5/2012 | Pederson et al. | |
| 2006/0267734 | A1 * | 11/2006 | Taki | G06K 7/0008 340/10.4 |
| 2009/0045917 | A1 * | 2/2009 | Volpi | G01S 13/66 340/10.1 |
| 2013/0148807 | A1 * | 6/2013 | Schwager | H04L 9/0861 380/270 |

* cited by examiner

*Primary Examiner* — Jennifer Mehmood
*Assistant Examiner* — Pameshanand Mahase
(74) *Attorney, Agent, or Firm* — Anthony D. Pellegrini

(57) ABSTRACT

An emergency alert system comprising one or more access-controlled wireless transmitters and a plurality of wireless wearable receivers that can be deployed locally to privately warn users of potential danger, by allowing authorized users to use the transmitters to send alert signals to the receivers.

19 Claims, 7 Drawing Sheets

WIRELESS SAFETY ALERT SIGNALING SYSTEM

BACKGROUND OF THE INVENTION

1. Technical Field

The present invention relates generally to wireless transmitters and receivers. More particularly, the present invention relates to an emergency alert system that can be deployed locally to warn users of potential danger, by employing access-controlled transmitting units that wirelessly transmit alert signals to wearable receiver units.

2. Description of Prior Art

In the aftermath of the tragedy at Sandy Hook Elementary School in Newtown, Conn., there has been a dramatic push to improve school safety. School violence is on the rise. A review of the data shows that since 1980, in the United States alone, there have been a total of 137 school shootings, each resulting in the death of least one victim, and these numbers have risen each decade[1].

[1] Kirk, Chris (Dec. 19, 2012), "Since 1980, 297 People Have Been Killed in School Shootings": Slate.

In March of 2013, in response to the need for immediate school-level funding support, the United States Department of Homeland Security opened up grant opportunities to allow school districts to purchase and install remotely-controlled entry access systems, panic buttons that are hard-wired to law enforcement agencies, "Knox Boxes" to safely secure keys for first responders, and exterior door numbering to assist first responders in situational awareness[2]. Each of these options has merit because it offers the same thing: time. Either slowing down the attacker or speeding up the external response gains time. Nationally, the focus has been on issues surrounding guns; banning specific types, requiring background checks, limiting magazine capacity and, even, arming teachers. Interestingly, bans on assault weapons and high-capacity ammunition magazines are also time related.

[2] Maine Emergency Management Agency (Mar. 18, 2013), "School Security Funding Opportunity For School Administrative Units": www.Maine.gov.

While there are many security improvements and additional safety devices that have been developed, improved upon, and employed in the name of school safety, none adequately serve to notify all persons in the building or on the grounds of the safety concern. The signal typically comes from the main office, or main point of entry, through the intercom system. If the ability to use the intercom is compromised, which is often the case, effectively implementing a lockdown becomes unlikely. Furthermore, announcing a lockdown over the intercom could serve to intensify certain situations and diminish opportunities for peaceful resolutions.

There have been several developments in technology that can help tighten security, but they commonly involve costly equipment and construction, and are often dependent on wireless capabilities that are still not available in many rural areas. Also, the panic buttons that exist in businesses and, more recently, schools only serve to notify police and security personnel of a potential crisis and do not notify those on the premises. Additionally, remote areas without local law enforcement may have exceptionally long response times. While signaling for help can be of critical importance, lives may be lost before its arrival. Ideally, notifying the people inside the building as well as law enforcement should be both silent and simultaneous.

Most schools have Comprehensive Emergency Plans that are designed to address multiple scenarios, and being capable of immediately notifying the staff of the danger increases the chances for successful implementation of the plan. If the location is also known, the opportunities to save lives are dramatically increased. For example, if the PE teacher knew there was a problem in the main office he/she could make a decision based on the situation. In this example, possible options could be to execute the lockdown procedure, evacuate through rear of gym, or possibly, prepare to confront an attacker. Time needs to be available to those confronting the situation at the school, because they are responsible for the safety of the children.

There is thus demonstrated the need for a system that can be deployed to provide early warning of potential danger to all persons subject to that danger. While the primary purpose for such a system is to improve school safety, the system is also useful in other settings, such as businesses, health care institutions, and other settings that potentially may be targets of attack.

It is thus an object of the present invention to present a wireless safety alert signaling system.

It is a further object of the present invention to present a wireless safety alert signaling system that silently alerts all persons present in the immediate area of danger.

It is yet a further object of the present invention to present a wireless safety alert signaling system that uses multiple transmitters dispersed about the premises to provide easy access to persons to initiate warnings.

It is yet a further object of the present invention to present a wireless safety alert signaling system that uses multiple wearable receivers that can simultaneously receive danger warnings.

It is yet a further object of the present invention to present a wireless safety alert signaling system that employs key devices to provide access control of the transmitters so that only authorized persons can initiate a danger warning signal.

It is yet a further object of the present invention to present a wireless safety alert signaling system that does not rely upon hard wired communications systems, such as intercoms.

It is yet a further object of the present invention to present a wireless safety alert signaling system that does not rely upon cellular telephone communications technology.

It is yet a further object of the present invention to present a wireless safety alert signaling system that is simple to use.

It is yet a further object of the present invention to present a wireless safety alert signaling system that is inexpensive to manufacture and deploy.

Other objects of the present invention will be readily apparent from the description that follows.

SUMMARY OF THE INVENTION

The present invention discloses a wireless safety alert signaling system having one or more transmitters, a plurality of wearable receivers, and a key means used to allow only authorized users to access the one or more transmitters to initiate transmission of warning signals. Upon activation, a transmitter sends a wireless radio signal to all receivers simultaneously. The receivers are provided with one or more human perceptible indicators, such as lamps or vibrators, so that a user wearing a receiver can be privately alerted to the potential danger upon receipt of a signal from a transmitter. The meaning of the indicators can be determined by local protocol, so that a flashing lamp might have one meaning in one context but another meaning in another context. Where multiple transmitters are used, they may be deployed in various strategic locations to provide for rapid access by authorized personnel. The key means prevents unauthorized use of the transmitters. An example would be multiple transmitters deployed throughout a school building, much like fire alarm pull boxes. Since only authorized persons such as teachers, administrators, and staff would be provided key means, the risk that the transmitters would be misused to send spurious warnings, for example, by students or visitors, is minimized.

The key means can be implemented using a variety of technologies, such as a traditional physical key and lock used to unlock a secured unit; a magnetic strip that is read by a magnetic strip reader; a code input using a data entry keypad; a body part scanned by a biometric reader; or an electronic radio frequency identification (RFID) tag that is read by a radio frequency identification reader. With RFID tags the authorized user need only approach a transmitter; the key is recognized and validated automatically, enabling rapid access. Where the key means is a magnetic strip or an electronic radio frequency identification tag, it can be integrated with the receiver, so that any person authorized to wear a receiver can also activate a transmitter. Alternatively, only certain receivers may have integrated key means, for example, where only trained personnel (and not visitors or substitute teachers) have access to the transmitters.

In the preferred embodiment, the receivers are integrated with common objects readily associated with users, such as security or identification badges, badge holders, and the like. In a school context, each adult on the premises can be given a small device that will flash and/or vibrate to signal a safety concern or immediate danger. For example, temporary employees/substitutes and visitors/volunteers could easily be given a receiver while on the premises. Most school districts and other large organizations now require employees to wear identification badges, so combining this safety requirement with an additional safety device is a logical and simple expectation. These devices can have many different configurations, but it is essential that they are easily mobile and small enough to be clipped onto clothing, worn as a badge, worn around the neck, or kept in a pocket.

For purposes of illustration, the system of the present invention may be deployed in a school building by placing the transmitters in offices, classrooms, and hallways. The key means may be integrated with the receivers and configured as security badges to be worn by all adults present on the premises. Upon a threat of danger, a person wearing an RFID-enabled receiver goes to a transmitter (which automatically becomes available for use) and activates a switch which initiates transmission of a warning signal simultaneously to all of the receivers. Once activated the receivers will flash and/or vibrate. This alert can serve to notify everyone that the premises are under lockdown, or whatever procedure corresponds to the school's plan. Potentially, different flashing colors or patterns can be activated by selecting the appropriate switch or button on a transmitter to signal different procedures. For example, a flashing and vibrating red signal could signify a lockdown protocol while a blue signal could signify a "shelter in place" protocol, or one color alerts to danger inside the building and another notifies of an outside danger. With this information students inside could be quietly evacuated or secured in their classrooms, and students outside could be kept away or brought inside, depending on the signal and the associated protocol.

The cost of the system will be relatively inexpensive and affordable for the smallest school districts, and the individual receiver units can easily be replaced. While the systems can be very detailed and elaborate, a simple version of the device is all that is necessary to alert the staff of the presence of danger. This is essential for remote schools having the greatest need to activate their emergency plans, because help may not be available in a reasonable amount of time.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

DETAILED DESCRIPTION OF THE INVENTION

Figure 1:
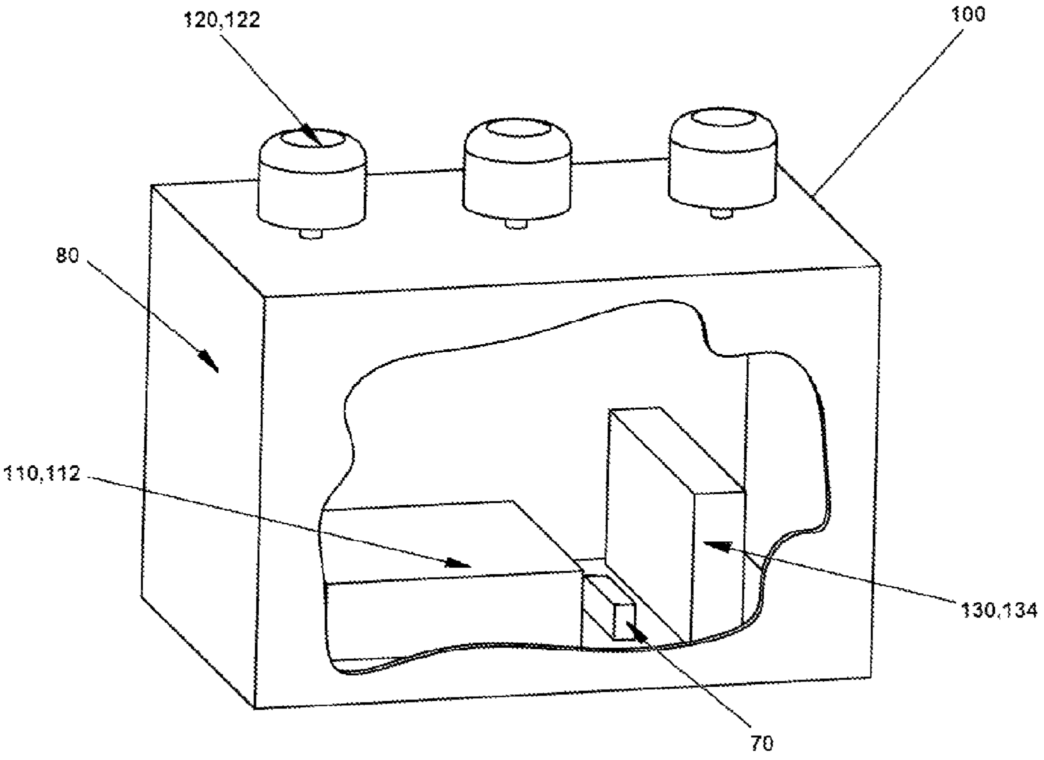
FIG. 1 is a schematic view of one embodiment of a transmitter of the present invention, with a cutaway portion revealing interior components.

The wireless safety alert signaling system 1 of the present invention comprises a transmitter 100, a receiver 200, and a key means 300. The transmitter 100 serves to generate and transmit one or more distinct wireless signals upon a user 10 taking an initiating action. The receiver 200 serves to receive the one or more distinct signals and to provide a human perceptible indication of the receipt of the one or more signals to one or more other users 10. The key means 300 allows a user 10 to access the transmitter 100; only users 10 with the key means 300 will be allowed access to the transmitter 100. This allows the transmitter 100 to be placed in a public, readily accessible location, while preventing unauthorized use.

The transmitter 100 further comprises a transmitting means 110, an activating means 120, and a locking means 130. See FIG. 1. The transmitter 100 will also have a power supply 70. This may be a hard-wired connection to an electrical system, or may include an electrical cord configured to be placed into an electrical outlet, or may comprise one or more rechargeable or replaceable batteries, or may comprise a solar panel, or any other suitable power source. The transmitter 100 further may be housed within a casing 80, with the casing 80 made of any suitable material, such as plastic, composites, metal, alloys, and the like. The transmitter casing 80 may be further configured for mounting on a wall, or it may be placed on a surface, such as a shelf, on the floor, on a desk, or even inside a drawer. If the transmitter 100 will be mounted outdoors, the casing 80 should be configured in a watertight manner, as is well known in the art. The transmitting means 110, the locking means 130, and the power supply 70 may be contained within the casing 80. See FIG. 1. The activating means 120 should be located on an exterior surface of the casing 80 for ready access. See FIGS. 1, 4A, and 5. In some configurations the locking means 130 may also be located on an exterior surface of the casing 70. See FIGS. 4A and 5.

Figure 3:
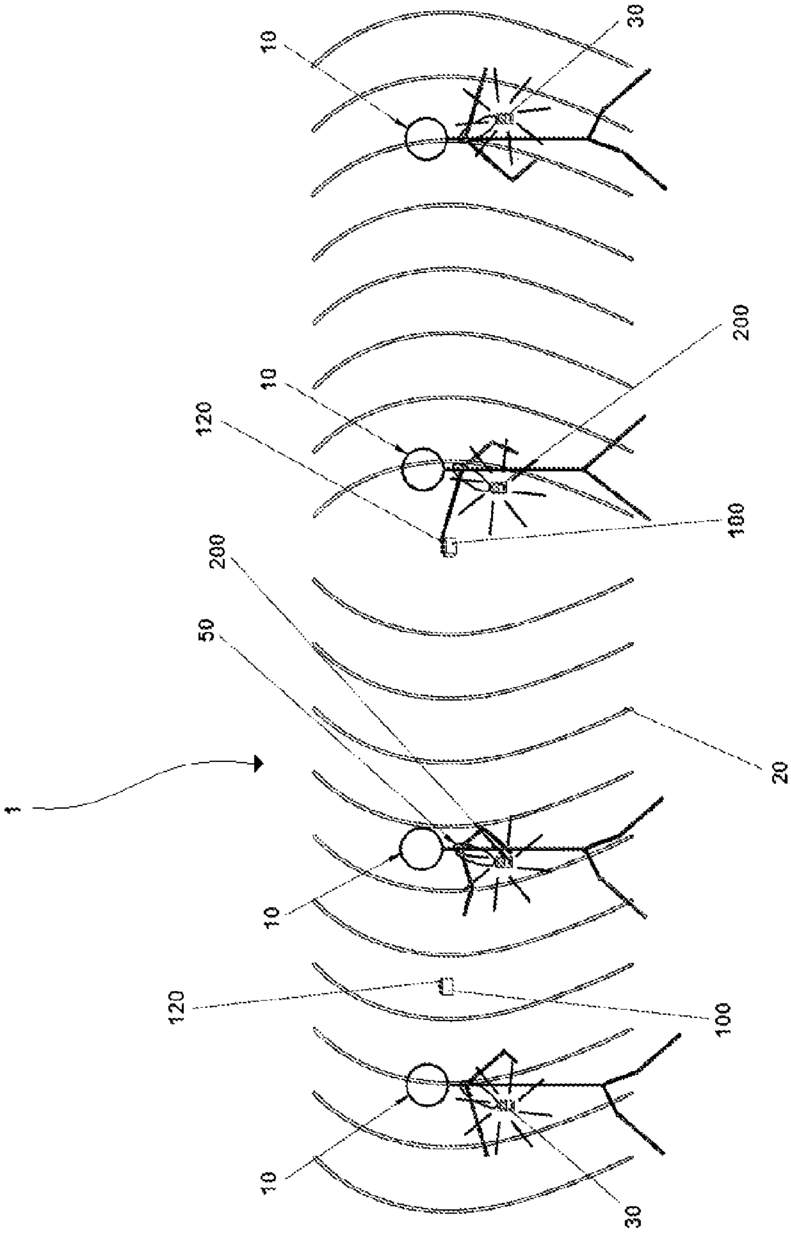
FIG. 3 is a schematic representation of the system of the present invention in use, with one user activating a transmitter and all users receiving warning signals as a result.

The transmitting means 110 of the transmitter 100 is configured to generate and wirelessly transmit signals. This may be accomplished by any means known in the art. In the preferred embodiment the transmitting means 110 is a radio transmitter 112, and the signals wirelessly transmitted by the transmitting means 110 are radio signals 20. See FIGS. 1 and 3.

The activating means 120 of the transmitter 100 is configured to allow a user 10 to initiate the generation and transmission of signals by the transmitter 100. In one embodiment, the activating means 110 comprises a push button 122. When the activating means 110 is operable, a user 10 may initiate the generation and transmission of signals by the transmitter 100 by depressing the push button 122. In another embodiment, the activating means 110 comprises a data entry keypad 128. See FIG. 5. When the activating means 110 is operable, a user 10 may initiate the generation and transmission of signals by the data entry keypad 128 by entering a correct key stroke or series of keystrokes. In yet other embodiments, the activating means 110 comprises a toggle switch, or a key-in-lock mechanism, or a sliding switch, or any other practical configuration that allows a user 10 to activate the transmitter 100.

In some embodiments of the present invention, the activating means 120 of the transmitter 100 is configured to allow the user 10 to initiate the generation and transmission of a plurality of distinct signals by the transmitter 100. This is useful in that the system 1 can then be used to convey more information, depending on the signal sent. Where, for example, a system 1 having only one type of signal can convey the message "Danger!", a system 1 having a plurality of distinct signals can convey several types of messages, such as "Danger! Evacuate!" or "Danger! Shelter in place!" or "Warning! Suspicious person outside premises" or "Warning! Suspicious person inside premises". Transmitters 100 capable of generating and transmitting a plurality of distinct signals are well known in the art.

In one such embodiment, the activating means 120 of the transmitter 100 comprises a plurality of push buttons 122, see FIG. 1, with each push button 122 corresponding to one of the plurality of distinct signals the transmitter 100 is configured to generate and transmit. Upon the user 10 depressing one of the push buttons 122, the transmitter 100 generates and transmits one of the plurality of distinct signals corresponding to that push button 122.

In another embodiment, the activating means 120 comprises a selectable switch 124 and a push button 122, with the switch 124 configured to select among one of the plurality of distinct signals and the push button 122 configured to initiate the generation and transmission of the particular signal selected by the user 10 via the switch 124. See FIG. 4A. Upon the user 10 selecting a distinct signal by use of the switch 124 and then depressing the push button 122 the transmitter 100 generates and transmits the particular signal corresponding to the selection indicated by the switch 124. The switch 124 may be in the form of a dial, or a slider, or any other well known devices enabling a user 10 to select one item out of a range of choices. The push button 122 may be integrated with the switch 124 (whereby the switch 124 may be both moved and depressed), or a separate component.

In yet another embodiment, the activating means 120 comprises a data entry keypad 128 configured to select among one of the plurality of distinct signals and to initiate the generation and transmission of the selected signal. See FIG. 5. The user 10 selects a distinct signal by keying in, for example, an index number that corresponds to a particular signal. Using the example provided above, the key code "01" could correspond to the message "Danger! Evacuate!", the key code "02" could correspond to the message "Danger! Shelter in place!", etc. Upon the user 10 entering the appropriate information into the data entry keypad 128 the transmitter 100 generates and transmits the particular signal corresponding to the selection made.

In yet another embodiments, the activating means 110 may comprise a number of toggle switches, each corresponding to a particular signal, or a series of sliding switches, or any other practical configuration that allows a user 10 to select from a plurality of distinct signals and to activate the transmitter 100 to generate and transmit the selected signal.

The locking means 130 of the transmitter 100 is configured to place the transmitter 100 in unlocked mode or in locked mode. When the transmitter 100 is in unlocked mode the activating means 120 of the transmitter 100 is operable by the user 10. When the transmitter 100 is in locked mode the activating means 120 of the transmitter 100 is inoperable by the user 10. Inoperability is desired to prevent unauthorized persons from activating the transmitter 100. The key means 300 is manipulated by the user 10 and is configured to interact with the locking means 130 of the transmitter such that the interaction of the key means 300 with the locking means 130 places the transmitter 100 in unlocked mode. In one embodiment the key means 300 comprises a plurality of key devices 310. Each key device 310 is configured to interact with the locking means 130 of the transmitter 100, with any one of the plurality of key devices 310 being capable of being used to place the transmitter 100 in unlocked mode.

Figure 4A:
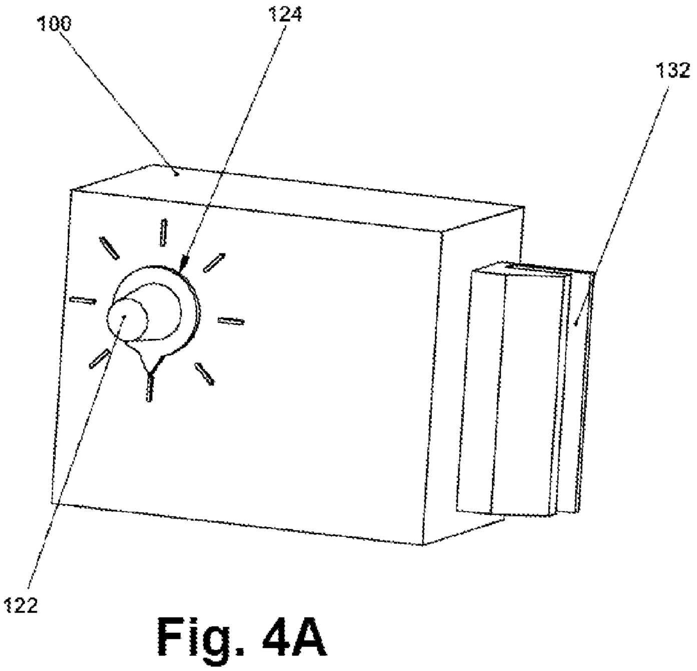
FIG. 4A is a schematic view of another embodiment of a transmitter of the present invention, having a magnetic strip reader locking means and a selectable switch activating means.
Figure 4B:
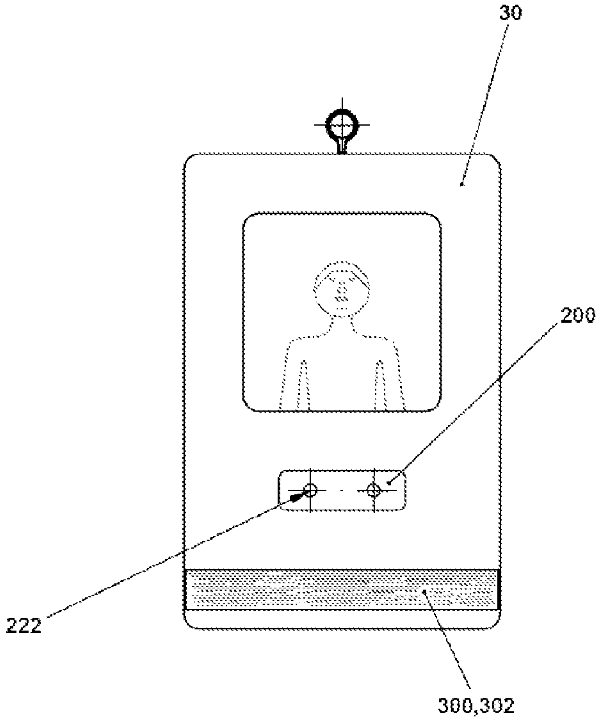
FIG. 4B is a schematic view of another embodiment of a receiver of the present invention configured to work with the transmitter depicted in FIG. 4A, having a magnetic strip key means and a plurality of lamps, the receiver and key means integrated with a security badge.
Figure 5:
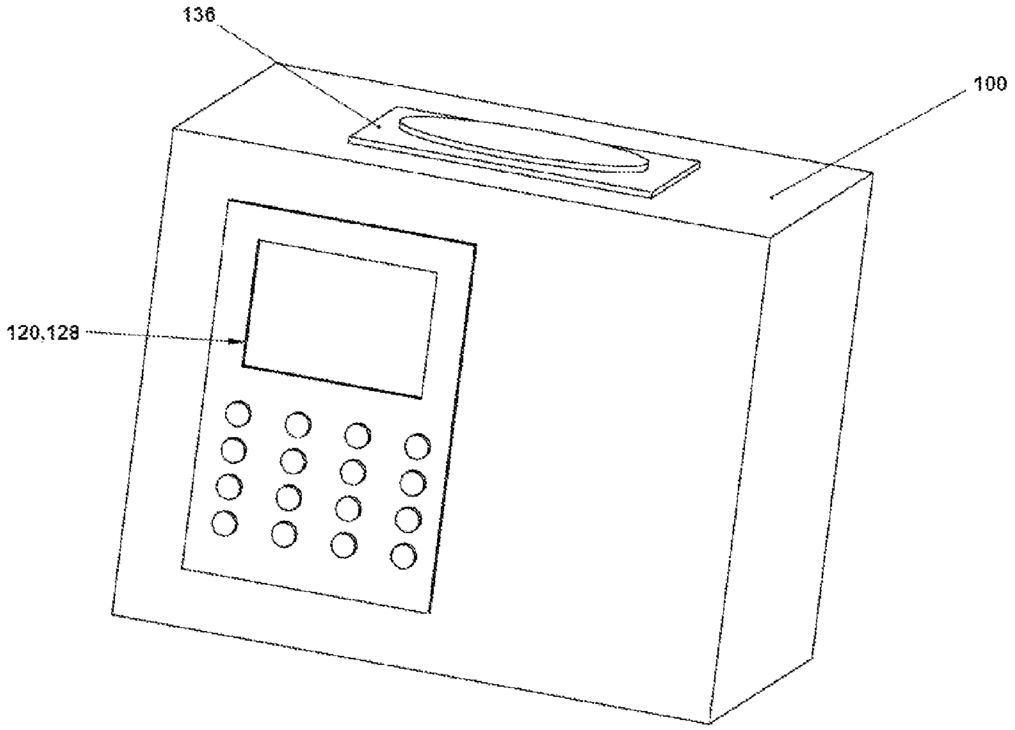
FIG. 5 is a schematic view of yet another embodiment of a transmitter of the present invention, having a biometric (thumb print) reader locking means and a data entry keypad activating means.
Figure 6:
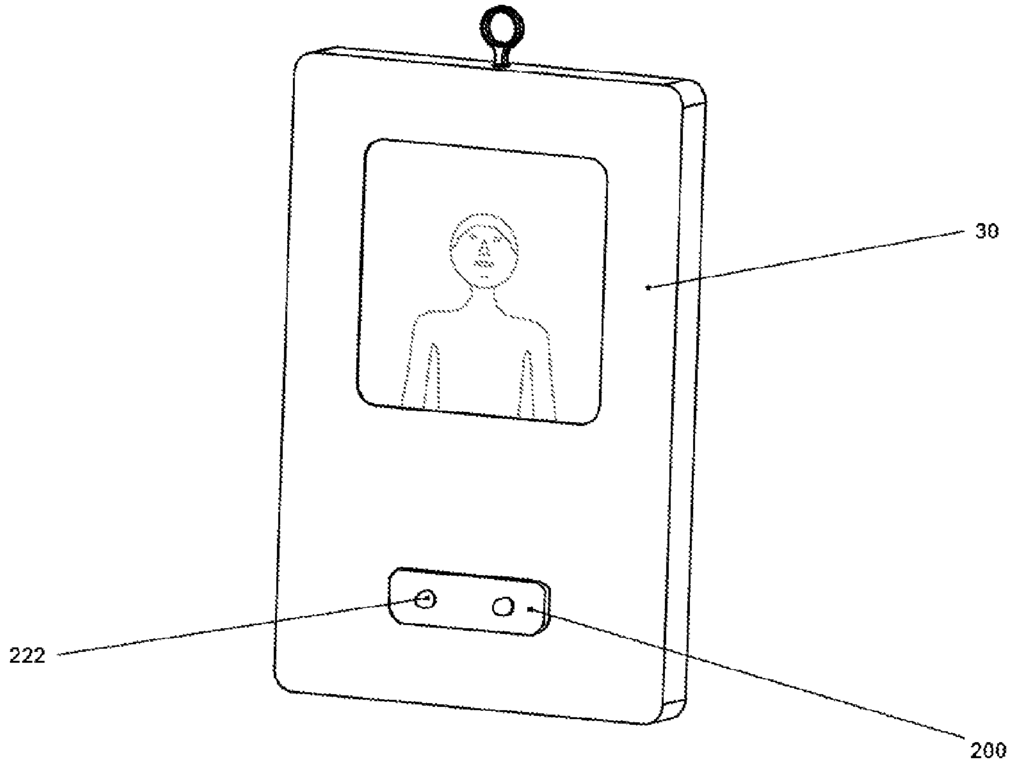
FIG. 6 is a schematic view of yet another embodiment of a receiver of the present invention, being integrated with a security badge (but without a key means).

In one embodiment, the locking means 130 of the transmitter 100 comprises a magnetic strip reader 132, see FIG. 4A, and the key means 300 comprises a magnetic strip 302, see FIG. 4B. The magnetic strip 302 is coded with an access code recognizable to the locking means 130. When the magnetic strip 302 is brought into contact with the magnetic strip reader 132 and the embedded code is recognized, the locking means 130 places the transmitter 100 in unlocked mode. The key means 300 may comprise a plurality of key devices 310, where each key device comprises a magnetic strip 302 and all of the magnetic strips 302 of the key devices 310 are coded with the same access code recognizable to the magnetic strip reader 132.

Figure 2:
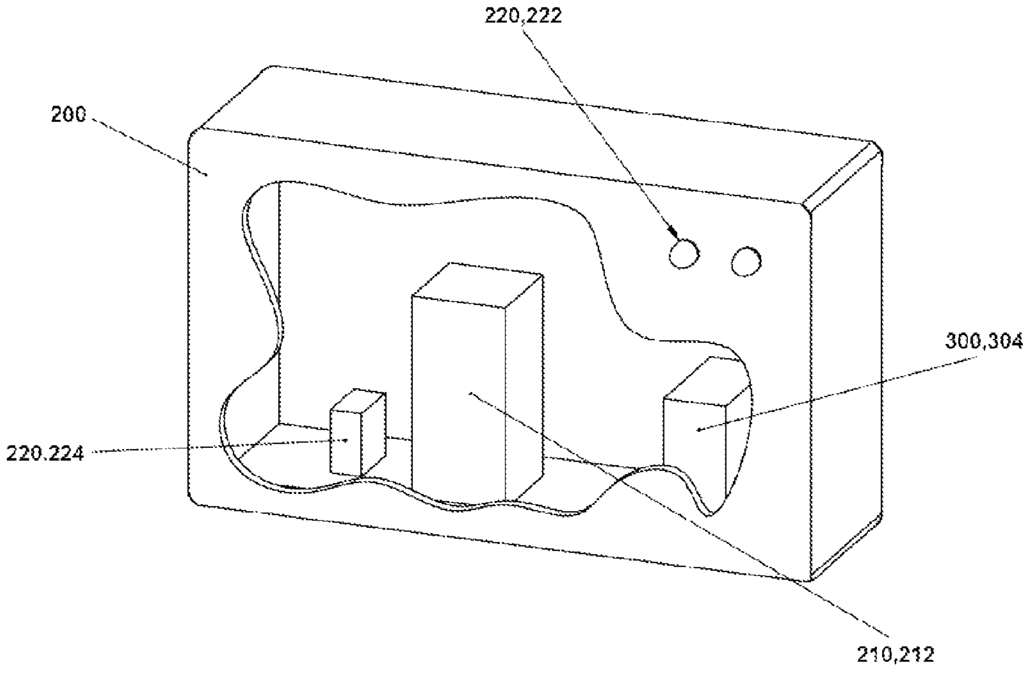
FIG. 2 is a schematic view of one embodiment of a receiver of the present invention, with a cutaway portion revealing interior components.
Figure 7:
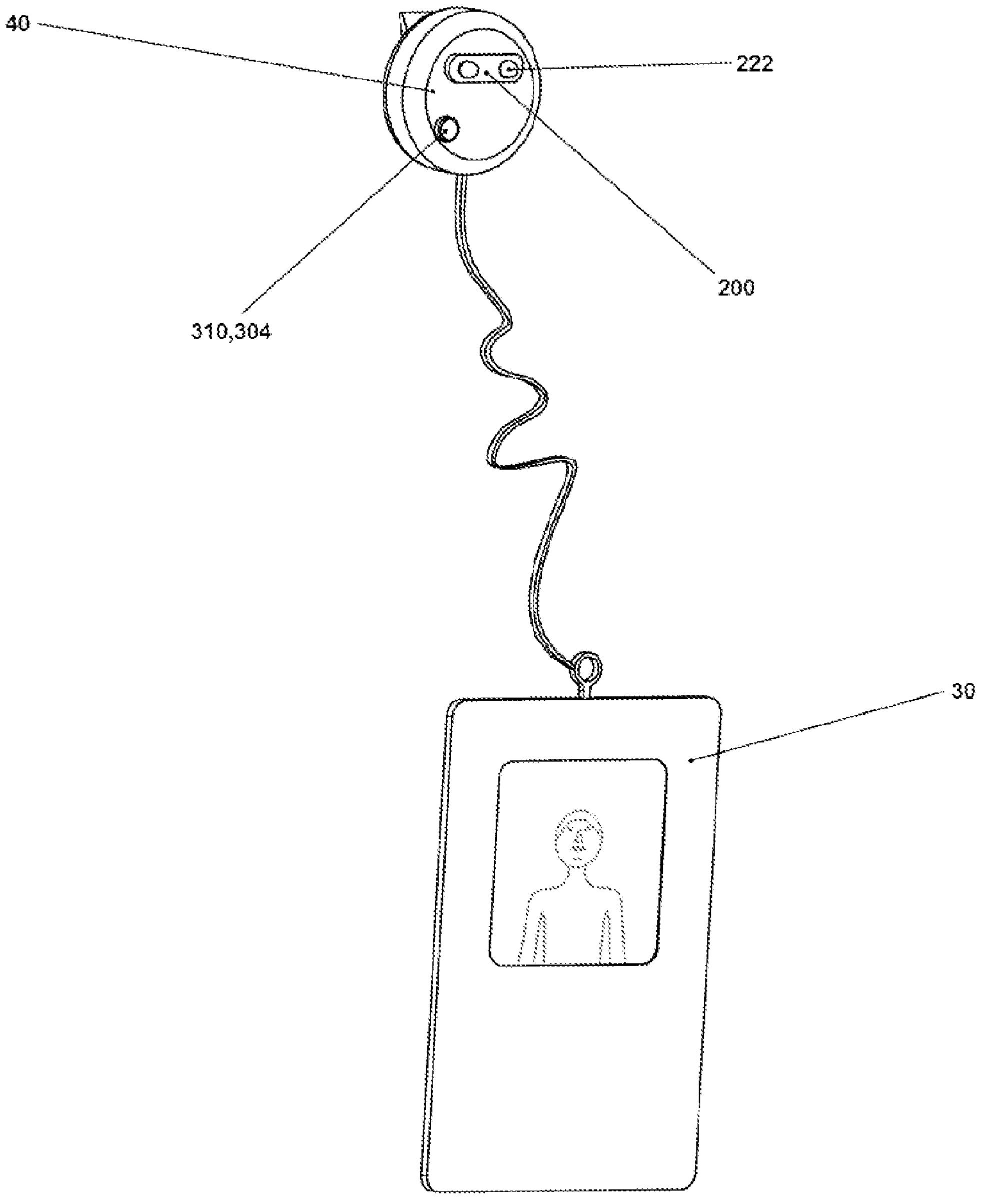
FIG. 7 is a schematic view of yet another embodiment of a receiver of the present invention, the receiver and key means integrated with a badge holder.

In another embodiment, the locking means 130 of the transmitter 100 comprises a radio frequency identification reader 134, see FIG. 1, and the key means 300 comprises an electronic radio frequency identification tag 304, see FIGS. 2 and 7. The electronic radio frequency identification tag 304 is coded with an access code recognizable to the locking means 130. When the electronic radio frequency identification tag 304 is brought into near proximity with the radio frequency identification reader 134 the electronic radio frequency identification tag 304 is energized by radio signals transmitted by the radio frequency identification reader 134; it therefore does not need its own independent power supply. The radio frequency identification reader 134 is configured to generate a weak radio signal with an effective range of a few inches. When the electronic radio frequency identification tag 304 is brought within the field of the radio signals, it is energized by the radio signals transmitted by the radio frequency identification reader 134 and in turn transmits its own signal, which is received by the radio frequency identification reader 134. The radio frequency identification reader 134 compares the radio signal from the electronic radio frequency identification tag 304 against a predetermined selection; a match indicates that the electronic radio frequency identification tag 304 corresponds to an authorized user 10, and the locking means 130 places the transmitter 100 in unlocked mode. The key means 300 may comprise a plurality of key devices 310, where each key device comprises a radio frequency identification tag 304 and all of the radio frequency identification tags 304 of the key devices 310 are coded with the same access code recognizable to the radio frequency identification reader 134.

In yet another embodiment, the locking means 130 of the transmitter 100 comprises a biometric reader 136. See FIG. 5. The key means 300 in this embodiment comprises a body part of the user 10 which is coded into the biometric reader 136. For example, if the biometric reader 136 is a thumbprint scanner, the key means 300 will be the thumbprints of the approved users 10. Similarly, if the biometric reader 136 is a retina scanner, the key means 300 will be the retinas of the approved users 10. Any of the biometric readers 136 known in the art may be used, as long as the biometric reader 136 is capable of recognizing the designated body part of the user 10. When the body part of an authorized user 10 interacts with the biometric reader 136 the locking means 130 places the transmitter 100 in unlocked mode.

In yet another embodiment, the locking means 130 of the transmitter 100 comprises a data entry keypad and a digital lock. The key means 300 in this embodiment comprises a code provided to the approved users 10 which is coded into the digital lock such that the code is recognized by the digital lock. When the user 10 enters the code into the data entry keypad the locking means 130 places the transmitter 100 in unlocked mode. The code may be any combination of alphanumeric or special characters, or symbolic characters, or the like. In yet another embodiment a single data entry keypad can be used as a component of both the activating means 110 and the locking means 130.

In yet another embodiment, the locking means 130 of the transmitter 100 comprises a traditional lock and the key means 300 comprises a traditional key. When the user 10 inserts the key into the lock and unlocks the transmitter 100 the locking means 130 places the transmitter 100 in unlocked mode.

The receiver 200 of the present invention further comprises a receiving means 210 and an indicating means 220. See FIG. 2. The receiver 200 may also have a power supply 70, though this is an optional requirement, depending on the specific configuration of the receiver 200. If a power supply 70 is present, it may be one or more low profile batteries or a solar panel, or any other suitable power source. The receiver 200 further may be housed within a casing, with the casing made of any suitable material, such as plastic, composites, metal, alloys, and the like. The receiver casing will be configured such that it can be worn by a user 10. If a power supply 70 is used it may be contained within the receiver casing.

The receiving means 210 of the receiver 200 is configured to receive wirelessly transmit signals transmitted by the transmitting means 110 of the transmitter 100. This may be accomplished by any means known in the art. In the preferred embodiment the receiving means 210 is a radio receiver 212, and the signals wirelessly received by the receiving means 210 are radio signals 20. See FIG. 3.

The indicating means 220 of the receiver 200 is configured to provide at least one human perceptible indication when the receiving means 210 of the receiver 200 receives a wirelessly transmitted signal. In one embodiment, the human perceptible indication is achieved through the use of a lamp 222. See FIGS. 2, 4B, 6, and 7. The lamp 222 is illuminated upon the receiver 200 receiving a signal. The lamp 222 may be any practical configuration known in the art. In the preferred embodiment it is a light emitting diode (LED). The lamp 222 may be colorless or colored.

In another embodiment, the human perceptible indication is achieved through the use of a vibratory means 224. See FIG. 2. The vibratory means 224 is activated upon the receiver 200 receiving a signal. The vibratory means 224 may be any practical configuration known in the art that causes a vibration that is perceptible to a user 10.

In yet another embodiment, the human perceptible indication is achieved through the use of an audio means. The audio means is activated upon the receiver 200 receiving a signal. The audio means may be any practical configuration known in the art that creates a sound that is perceptible to a user 10. An example may be an electrical tone generator, a buzzer, or the like.

In the preferred embodiment, the indicating means 220 of the receiver 200 is configured to provide a plurality of human perceptible indications. This may include a plurality of lamps 222, or a combination of a lamp 222 and a vibratory means 224, or a lamp 222 and a buzzer, etc. The preferred combination of a plurality of lamps 222 plus a vibratory means 224 allows the user 10 to be alerted to the transmission of a signal whether the user 10 is looking directly at the receiver 200 or not (through the vibratory means 224), while still providing the ability to discern from different messages (through the plurality of lamps 222).

Where the indicating means 220 comprises a plurality of lamps 222, in one embodiment each of the lamps 222 has a different color than each other lamp 222. Each lamp 222 corresponds to one of the plurality of distinct signals transmitted by the transmitter 100 and is associated with a particular message. Using the example provided above, the red lamp 222 could correspond to the message "Danger! Evacuate!", the blue lamp 222 could correspond to the message "Danger! Shelter in place!", etc. In yet another embodiment, the plurality of lamps 222 is configured to be illuminated in a plurality of different patterns. Each pattern corresponds to one of the plurality of distinct signals transmitted by the transmitter 100 and is associated with a particular message. For example, three lamps 222 with all three in constant illumination could correspond to the message "Danger! Evacuate!", three lamps 222 with only two in constant illumination could correspond to the message "Danger! Shelter in place!", three lamps 222 blinking in succession could correspond to the message "All Clear", etc. Where only a single lamp 222 is used, an illumination pattern still could be employed to convey a limited number of messages, such as constant on, fast blink, and slow blink.

The indicating means 220 of the receiver 200 may remain active after the receipt of a warning signal until affirmatively deactivated, for example, by use of an "off" switch or by removing the battery. Alternatively, the indicating means 220 of the receiver 200 may remain active after the receipt of a warning signal only for a predetermined period of time, and then automatically become deactivated until another warning signal is received. This is preferred as it allows an "All Clear" signal to be sent in appropriate circumstances.

In preferred embodiments the receiver 200 is wearable by the user 10. In one embodiment the receiver 200 is integrated with a security badge 30 or an identification badge. See FIGS. 4B and 6. This allows a receiver 200 to be provided to every user 10 who is ordinarily provided a badge, and eliminates the need to provide a separate device. In another embodiment the receiver 200 is integrated with a security badge holder 40. See FIG. 7. This has the advantage of providing a larger form factor for the receiver 200, while still retaining the advantages of each user 10 being provided a receiver 200. In yet other embodiments the receiver 200 is configured to be worn on a necklace 50 or a lanyard. See FIG. 3. This configuration has similar benefits as the configuration integrating the receiver 200 with a badge holder 40, but also provides receivers 200 to users 10 who might not ordinarily require a badge 30. In another embodiment the receiver 200 is configured to be clipped to an article of clothing. In yet another embodiment the receiver 200 is configured as a fob suitably adapted to be placed in a pocket of an article of clothing. In this embodiment the indicating means 220 of the receiver 200 comprises at least a vibratory means 224, so that when a signal is transmitted by a transmitter 100 the vibratory means 224 is activated and the user 10 will perceive the signal.

In a most preferred embodiment, the system 1 comprises a plurality of transmitters 100. See FIG. 3. This allows transmitters 100 to be placed in many different locations, both public and private, allowing for quicker access to the transmitters 100 in an emergency. Each of the plurality of transmitters 100 may be configured as described above, and generates the same one or more wireless signals that are receivable by the receiver.

In another most preferred embodiment, the system 1 comprises a plurality of receivers 200. See FIG. 3. This allows receivers 200 to be provided to a plurality of users 10, increasing the likelihood that a warning message conveyed by a wireless signal transmitted by the transmitter 100 will be perceived as quickly as possible by as large a number of users 10 as possible. Each of the plurality of receivers 200 may be configured as described above. In this embodiment the key means 300 may also comprise a plurality of key devices 310. These key devices 310 may be distributed to multiple authorized users 10. An example of a key device 310 would be a plastic card having a magnetic strip 302. In yet another embodiment, each of the plurality of key devices 310 is integrated with one of the plurality of receivers 200. This allows multiple key devices 310 to be distributed together with the receivers 200, so that multiple users 10 are provided with the ability of activating the one or more transmitters 100. An example of this configuration would be a receiver 200 and RFID tag 304 integrated with a security badge 30. In one such embodiment every receiver 200 is integrated with a key device 310. In other embodiments only some of the receivers 200 are integrated with a key device 310. This might be useful in a situation where only some users 10 are trained in detecting and reporting danger, while all users 10 are intended recipients of warning signals.

In the most preferred embodiment, the system 1 comprises a plurality of transmitters 100 and a plurality of receivers 200, allowing any one of a number of transmitters 100 located advantageously to signal multiple users 10 simultaneously. See FIG. 3. An example of a system 1 configured in this manner would be a school building with transmitters 100 located in every classroom, administrative office, and hallway, and with all teachers, administrators, and staff wearing receivers 200. At the first indication of danger, the nearest transmitter 100 would be activated and the appropriate signal would be sent to all users 10 wearing receivers 200. Where some receivers 200 are integrated with key devices 310, perhaps only teachers, administrators, and staff are assigned receivers 200 with integrated key devices 310, while adult visitors to the school might be assigned receivers 200 without integrated key devices 310, but would be given an explanation of how to interpret the indicating means 220. Thus, visitors (and students) would not be able to activate the transmitters 100, but trained school personnel would be able to activate the transmitters 100, and all adults present would receive the warning signal.

Modifications and variations can be made to the disclosed embodiments of the present invention without departing from the subject or spirit of the invention as defined in the following claims.

We claim:

1. A wireless safety alert signaling system comprising:

a transmitter, said transmitter having a transmitting means, an activating means, and a locking means;

a receiver, said receiver having a receiving means and an indicating means; and a key means;

wherein the transmitting means of the transmitter is configured to generate and wirelessly transmit signals;

the activating means of the transmitter is configured to allow a user to initiate the generation and transmission of signals by the transmitter;

the locking means of the transmitter is configured to place the transmitter in unlocked mode or in locked mode, whereby when the transmitter is in unlocked mode the activating means of the transmitter is permitted to be operated by the user and when the transmitter is in locked mode the activating means of the transmitter cannot be operated by the user, with the locking means of the transmitter comprising a radio frequency identification reader;

the key means is manipulated by the user and is configured to interact with the locking means such that the interaction of the key means with the locking means places the transmitter in unlocked mode, with the key means comprising an electronic radio frequency identification tag which is coded with an access code recognizable to the locking means of the transmitter;

the receiving means of the receiver is configured to receive wirelessly transmitted signals transmitted by the transmitting means of the transmitter; and the indicating means of the receiver is configured to provide at least one human perceptible indication when the receiving means of the receiver receives a wirelessly transmitted signal, whereby upon the electronic radio frequency identification tag of the key means being brought into near proximity with the radio frequency identification reader of the locking means of the transmitter, the locking means places the transmitter in unlocked mode.

2. The system of claim 1 wherein the transmitting means of the transmitter is a radio transmitter;

the receiving means of the receiver is a radio receiver; and the signals wirelessly transmitted by the transmitting means of the transmitter are radio signals.

3. The system of claim 1 further comprising a plurality of transmitters.

4. The system of claim 1 further comprising a plurality of receivers.

5. The system of claim 1 wherein the indicating means of the receiver comprises a lamp, whereby the lamp is illuminated upon the receiver receiving a signal.

6. The system of claim 1 wherein the indicating means of the receiver comprises a vibratory means, whereby the vibratory means is activated upon the receiver receiving a signal.

7. The system of claim 1 wherein the indicating means of the receiver is configured to provide a plurality of human perceptible indications upon the receiving means of the receiver receiving a wirelessly transmitted signal.

8. The system of claim 1 wherein the indicating means of the receiver comprises a lamp and a vibratory means, whereby the lamp is illuminated and the vibratory means is activated upon the receiver receiving a wirelessly transmitted signal.

9. The system of claim 1 wherein the activating means of the transmitter is configured to allow the user to initiate the generation and transmission of a plurality of distinct signals by the transmitter;

the receiving means of the receiver is configured to receive and differentiate among the plurality of distinct signals transmitted by the transmitter; and the indicating means of the receiver is configured to provide a plurality of different human perceptible indications, each said human perceptible indication corresponding to one of the plurality of distinct signals transmitted by the transmitter and received by the receiving means of the receiver.

10. The system of claim 9 wherein the activating means of the transmitter comprises a plurality of push buttons, with each push button corresponding to one of the plurality of distinct signals the transmitter is configured to generate and transmit;

whereby for each of the plurality of push buttons, upon the user depressing said push button the transmitter generates and transmits one of the plurality of distinct signals corresponding to said push button.

11. The system of claim 9 wherein the indicating means of the receiver comprises a plurality of lamps, each said lamp configured to be illuminated in a color different from each other lamp;

whereby each of the plurality of lamps corresponds to one of the plurality of distinct signals transmitted by the transmitter and received by the receiving means of the receiver, such that upon the receiver receiving said one of the plurality of distinct signals the corresponding lamp is illuminated.

12. The system of claim 11 wherein the indicating means of the receiver further comprises a vibratory means, whereby the vibratory means is activated upon the receiver receiving a signal.

13. The system of claim 9 wherein the indicating means of the receiver comprises one or more lamps;

whereby the one or more lamps are configured to be illuminated in a plurality of different patterns, each said pattern corresponding to one of the plurality of distinct signals transmitted by the transmitter and received by the receiving means of the receiver, such that upon the receiver receiving one of the plurality of distinct signals one or more of the one or more lamps are illuminated in the corresponding pattern.

14. The system of claim 13 wherein the indicating means of the receiver further comprises a vibratory means, whereby the vibratory means is activated upon the receiver receiving a signal.

15. The system of claim 4 wherein each of the plurality of receivers is wearable by one of a plurality of users.

16. The system of claim 15 wherein each of the plurality of receivers is integrated with one of the following group: an identification badge, a security badge, and a security badge holder.

17. The system of claim 15 wherein each of the plurality of receivers is configured to be worn on a necklace.

18. A wireless safety alert signaling system comprising:

one or more transmitters, each said transmitter having a transmitting means, an activating means, and a locking means;

a plurality of wearable receivers, each said receiver having a receiving means and an indicating means; and a key means;

wherein the transmitting means of each transmitter is a radio transmitter configured to generate and wirelessly transmit a plurality of distinct radio signals;

the locking means of each transmitter is configured to place said transmitter in unlocked mode or in locked mode, whereby when said transmitter is in unlocked mode the activating means of said transmitter is operable by one or more users and when said transmitter is in locked mode the activating means of said transmitter is inoperable by the one or more users;

the key means is associated with the locking means of each transmitter, wherein the key means is configured to interact with the locking means of each transmitter such that the interaction of the key means with said locking means places said transmitter in unlocked mode, with the key means comprising a plurality of key devices, with each key device configured to interact with the locking means of each transmitter, whereby each of the plurality of key devices is capable of being used to place each transmitter in unlocked mode, and each of the plurality of key devices is integrated with one of the plurality of receivers;

the activating means of each transmitter is configured to allow the one or more users to initiate the generation and transmission of the plurality of distinct radio signals by said transmitter, said activating means of said transmitter comprising a plurality of push buttons, with each push button corresponding to one of the plurality of distinct signals said transmitter is configured to generate and transmit, whereby for each of the plurality of push buttons, upon the one or more users depressing said push button said transmitter generates and transmits one of the plurality of distinct radio signals corresponding to said push button;

the receiving means of each receiver is a radio receiver configured to receive and differentiate among the plurality of distinct radio signals wirelessly transmitted by each of the transmitters;

each of the plurality of receivers is integrated with one of the following group: an identification badge, a security badge, a security badge holder, and a fob suitably adapted to be placed in a pocket of an article of clothing; and the indicating means of each receiver is configured to provide a plurality of different human perceptible indications upon the receiving means of said receiver receiving one of the plurality of distinct wirelessly transmitted radio signals, each said human perceptible indication corresponding to one of the plurality of distinct radio signals transmitted by each of the transmitters and received by the receiving means of each receiver, said indicating means of said receiver comprising a vibratory means and a plurality of lamps, whereby said plurality of lamps is configured to be illuminated in a plurality of different patterns, each said pattern corresponding to one of the plurality of distinct radio signals transmitted by said transmitter and received by the receiving means of said receiver, such that upon said receiver receiving one of the plurality of distinct radio signals one or more of said plurality of lamps are illuminated in the corresponding pattern and said vibratory means is activated.

19. A wireless safety alert signaling system comprising:

a transmitter, said transmitter having a transmitting means, an activating means, and a locking means;

a receiver, said receiver having a receiving means and an indicating means; and a key means;

wherein the transmitting means of the transmitter is configured to generate and wirelessly transmit signals;

the activating means of the transmitter is configured to allow a user to initiate the generation and transmission of signals by the transmitter;

the locking means of the transmitter is configured to place the transmitter in unlocked mode or in locked mode, whereby when the transmitter is in unlocked mode the activating means of the transmitter is operable by the user and when the transmitter is in locked mode the activating means of the transmitter is inoperable by the user;

the key means is manipulated by the user and is configured to interact with the locking means such that the interaction of the key means with the locking means places the transmitter in unlocked mode;

the receiving means of the receiver is configured to receive wirelessly transmitted signals transmitted by the transmitting means of the transmitter; and the indicating means of the receiver is configured to provide at least one human perceptible indication when the receiving means of the receiver receives a wirelessly transmitted signal;

whereby the indicating means of the receiver is configured to provide a plurality of different human perceptible indications upon the receiving means of said receiver receiving one of the plurality of distinct wirelessly transmitted radio signals, each said human perceptible indication corresponding to one of the plurality of distinct radio signals transmitted by the transmitter and received by the receiving means of the receiver, said indicating means of said receiver comprising a vibratory means and a plurality of lamps, whereby said plurality of lamps is configured to be illuminated in a plurality of different patterns, each said pattern corresponding to one of the plurality of distinct radio signals transmitted by said transmitter and received by the receiving means of said receiver, such that upon said receiver receiving one of the plurality of distinct radio signals one or more of said plurality of lamps are illuminated in the corresponding pattern and said vibratory means is activated.

* * * * *